United States Patent [19]

Bloom

[11] 4,309,019
[45] Jan. 5, 1982

[54] ADJUSTABLE TAILPIPE HANGER

[76] Inventor: Stephen R. Bloom, 12445 Levan Rd., Livonia, Mich. 48150

[21] Appl. No.: 203,088

[22] Filed: Nov. 3, 1980

[51] Int. Cl.³ ............................................ F16M 13/00
[52] U.S. Cl. .................................... 248/610; 248/59; 248/60
[58] Field of Search ...................... 248/58, 59, 60, 62, 248/610, 65; 180/89.2, 296, 309

[56] References Cited

U.S. PATENT DOCUMENTS

| 285,748 | 9/1883 | Gulick | 248/59 |
|---|---|---|---|
| 1,314,724 | 9/1919 | Winchester | 248/59 X |
| 1,362,244 | 12/1920 | Farley | 248/59 |
| 3,199,815 | 8/1965 | Martinkovic et al. | 248/59 |
| 3,261,579 | 7/1966 | Engman et al. | 248/60 |
| 3,270,992 | 9/1966 | Cassel | 248/60 |
| 4,004,768 | 1/1977 | Evans | 248/59 |
| 4,063,700 | 12/1977 | Brewer | 248/60 X |

FOREIGN PATENT DOCUMENTS 2206750 8/1973 Fed. Rep. of Germany ........ 248/60

Primary Examiner—J. Franklin Foss
Attorney, Agent, or Firm—Cullen, Sloman, Cantor, Grauer, Scott & Rutherford

[57] ABSTRACT

An automotive vehicle tailpipe hanger for securing a tailpipe clamp to a support means formed on the vehicle is made of an L-shaped member having a horizontal leg and a vertical leg which is normally arranged between and overlapped by and secured to the opposite end portions of a double-bent, elongated, rubber-like strip. The inverted U-shaped bight of the bent strip normally suspends the hanger from the vehicle support. The strip end portions and the vertical leg are each provided with a number of equally spaced apart openings along its length. A releasable, bolt-like mechanical fastener extends through pre-selected openings in the vertical leg and the overlapping end portions for varying the amount of relative overlap and thereby, adjusting the over-all height of the hanger. A C-shaped bracket is pivotally secured to the horizontal leg for holding a ring-like tailpipe clamp which encircles and supports a tailpipe.

3 Claims, 7 Drawing Figures

U.S. Patent   Jan. 5, 1982   4,309,019
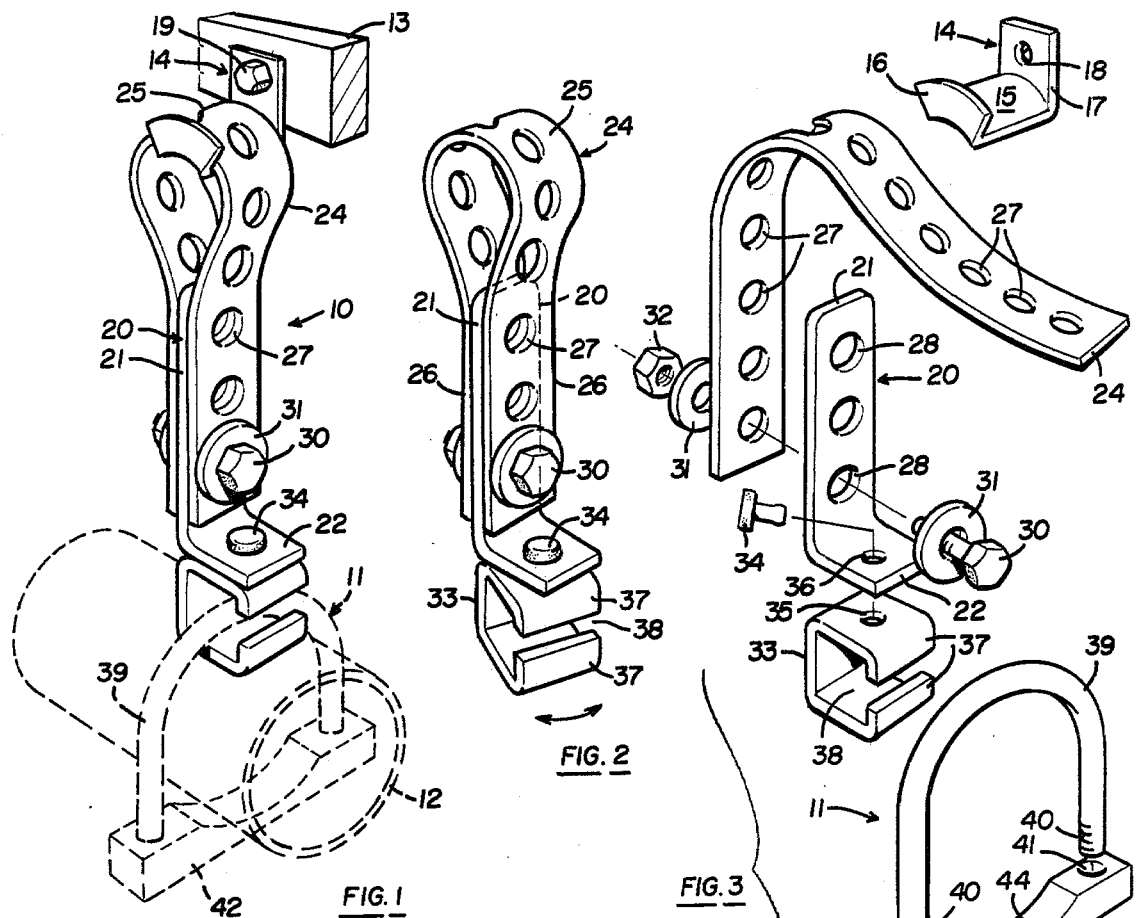
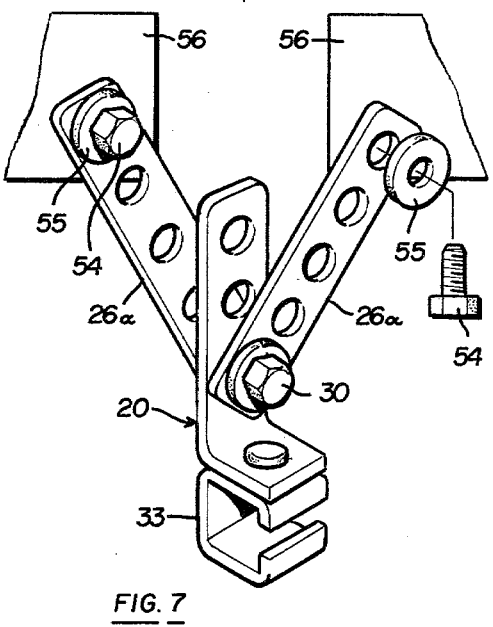
FIG. 1   FIG. 2   FIG. 3
FIG. 4   FIG. 5   FIG. 6   FIG. 7

ADJUSTABLE TAILPIPE HANGER

BACKGROUND OF INVENTION

Automotive vehicle tailpipes are conventionally suspended beneath the vehicle by means of a tailpipe hanger. Such hangers are connected to the tailpipe by the means of a suitable clamp and are also connected to the vehicle frame or chassis or the like.

In the construction of a new automotive vehicle, such as an automobile or truck, the manufacturer normally uses a hanger of a predetermined size and shape for each particular model vehicle. By way of example, conventional types of tailpipe hangers are disclosed in U.S. Pat. No. 2,912,198 issued Nov. 10, 1959 to Feil, U.S. Pat. No. 3,161,352 issued Dec. 15, 1964 to Brown, U.S. Pat. No. 3,292,887 issued Dec. 20, 1966 to Cassel, and U.S. Pat. No. 3,735,950 issued May 29, 1973 to Paintin. Conventional designs of such hangers usually include a resilient portion for absorbing and preventing the transmission of vibrations and noise from the tailpipe to the vehicle body, a suitable clamp portion for clamping or fastening the hanger to the tailpipe, and a means for fastening the upper end of the hanger to the vehicle itself. Because of the volume involved, the automobile manufacturer can use hangers which are non-adjustable or of predetermined size.

In use, tailpipe hangers tend to break over a period of time or alternatively, must be replaced when the tailpipe or muffler of the vehicle is replaced after these become worn. Service shops or garages which replace mufflers and tailpipes must handle a wide variety of models of vehicles of different sizes and shapes and thus, it is impractical for them to stock an original equipment model tailpipe hanger for each model vehicle. Hence, it is desirable to provide replacement shops with hangers that are adjustable to fit a variety of model vehicles. These adjustable tailpipe hangers are frequently referred to as "universal", meaning that various parts of them can be adjusted in length or angle to fit different model vehicles. Examples of such adjustable or "universal" tailpipe hangers are disclosed in U.S. Pat. No. 2,774,706 issued May 8, 1956 to Gerdy, U.S. Pat. No. 3,261,579 issued July 19, 1966 to Engman, U.S. Pat. No. 3,289,984 issued Mar. 11, 1966 to Clemons, U.S. Pat. No. 3,316,605 issued May 2, 1967 to Tabbert and U.S. Pat. No. 4,004,768 issued Jan. 25, 1977 to Evans.

Although each of these prior universal type hangers can be adjusted to accommodate different tailpipe support arrangements, some of these are limited in the number of adjustments available and others, require substantial labor for adjusting the hanger size or mounting angle. For example, in many prior hangers, the hanger is provided with an elongated, heavy metal strap, which must be bent by the installing mechanic to appropriately fit against the vehicle support. In the so called "heavy duty" types of hangers, the metal straps are relatively stiff, being formed of thick steel sheet, so that it is difficult and time consuming to properly bend these or to otherwise adjust them for mounting.

In addition, certain types or original equipment straps are made to loop over or suspend from simple brackets and are fastened upon or formed within the vehicle frame or chassis. The typical adjustable replacement brackets bypass the original equipment bracket since it has been difficult to form a single adjustable hanger which can either use different size existing vehicle brackets or alternatively, can be fastened to other portions of the vehicle.

Hence, the invention herein relates to a universally adjustable tailpipe hanger having an unusually large number of adjustments and the option of utilizing the vehicle original equipment hanger support bracket.

SUMMARY OF INVENTION

The invention herein contemplates a universally adjustable tailpipe hanger formed of three major parts, namely, an L-shaped bracket having a vertically elongated leg, second, a double bent, inverted U-shaped resilient strap forming a bight or loop and a pair of strap legs positioned on opposite sides of the bracket elongated leg and third, a bracket member pivotally secured to the horizontal leg of the L-shaped bracket for engagement with a standard muffler clamp or the like which connects the tailpipe to the hanger. The bight of the elongated strap normally loops over and supports the hanger from the existing vehicle tailpipe bracket. Alternatively, it may be secured by a mechanical fastener, such as a screw or bolt, to another portion of the vehicle chassis or frame.

The resilient strap is provided with evenly spaced holes along its length which match a number of holes formed in the elongated vertical leg of the L-shaped bracket. Thus, by selectively aligning holes in the two straps or legs formed by the bent elongated strap, with the L-shaped vertical leg and fastening them together with one or more bolts or the like fasteners, the length of the hanger can be adjusted, i.e., by varying the amount of overlap between the straps and the bracket leg.

With this arrangement, the elongated leg of the bracket tends to stiffen or reinforce the hanger in the vertical direction. The double bent resilient strip provides the necessary sound and vibration absorption as well as support from the vehicle. Varying the overlap between the resilient strip and the bracket leg varies the length of the hanger. Meanwhile, the angular adjustment of the hanger can be obtained by pivoting the muffler clamp bracket support.

Varying the lengths of overlap of each of the straps relative to the bracket leg or by splitting the strap in half at the bight to form two separate adjustable strap elements, permit a wide variety of choices for fastening the hanger to the vehicle. This can accommodate a large number of different tailpipe support arrangements. That is, this hanger gives a maximum number of adjustments to fit a maximum number of different models. Simultaneously, this provides a relatively inexpensive and simple mechanical construction which can be mounted beneath a vehicle with minimum labor and time. Particularly, the length of the hanger is quickly changed by relocating the fastening bolts that secure the resilient straps to the bracket leg as contrasted with the previously required laborious manual bending or cutting of the steel support strips which have been used in the prior types of adjustable hangers.

These and other objects and advantages of this invention will become apparent upon reading the following description, of which the attached drawings form a part.

DESCRIPTION OF DRAWINGS

FIG. 1 is a perspective view of the tailpipe hanger supporting a vehicle tailpipe from the vehicle frame.

FIG. 2 is a perspective view of a tailpipe hanger per se with the lower bracket adjusted horizontally.

FIG. 3 is a perspective view showing the disassembled parts which make up the tailpipe hanger, along with the vehicle support bracket and muffler clamp.

FIG. 4 is an end view showing the hanger supported by a screw directly to the vehicle frame.

FIG. 5 is an end view showing the hanger adjusted so that the straps are of uneven length for adjusting the length of the hanger.

FIG. 6 is another end view showing the resilient strip encircling a rod-like vehicle support portion, thereby illustrating a different adjustment available.

FIG. 7 illustrates, in perspective, the resilient strip split into two separate straps for securement to two separate places upon the vehicle.

DETAILED DESCRIPTION

FIG. 1 illustrates a tailpipe hanger 10 supporting a conventional tailpipe or muffler clamp 11 which encircles and supports a conventional tailpipe 12. The clamp and tailpipe are shown in dotted lines.

The hanger is suspended from the vehicle frame or chassis or body portion 13. FIG. 1 illustrates a conventional frame bracket 14 which is used by the original vehicle manufacturer in many model vehicles for attaching the tailpipe hanger to the vehicle frame.

The conventional frame bracket 14, as illustrated in FIG. 3, comprises a horizontal, transversely curved leg 15 having a free edge flange 16 and a flat vertical leg 17 having a bolt hole 18. The bracket is fastened, by a conventional bolt or machine screw 19, to the vehicle frame or chassis. In the original equipment, i.e., the vehicle as coming from the factory, the hanger is of a predetermined, non-adjustable length, looped over or suspended from the frame bracket leg 15. FIG. 1 illustrates the use of the already available frame bracket 14 for supporting the tailpipe hanger 10 of this invention.

The tailpipe bracket herein comprises an L-shaped member 20 which is made of a thin, narrow, metal strip, such as sheet steel that is relatively strong and rigid. For example, a 14 gauge or 16 gauge steel may be used for forming the L-shaped member.

The L-shaped member or bracket is provided with an elongated vertical leg 21 and a relatively shorter, horizontal leg 22. FIG. 3 illustrates this member disassembled from the other parts which form the hanger.

The hanger also includes a rubber-like, elongated strip 24. Conventionally, the rubber-like strips used in tailpipe hangers, regardless of the shape or configuration, are made of portions cut from used vehicle tires. Although other rubber-like materials can be used, this material is readily available and is economically feasible for this purpose. Thus, the strip may be made of a width which corresponds to the width of the L-shaped member 20, of a thickness which may vary depending upon the thickness of the tire wall, e.g. one-eighth of an inch, and may be formed of a rubber or synthetic rubber-like material with internal plys of cloth-like or metal strand material.

The strip 24 is preferably double bent into an inverted U-shape to provide a bight or loop 25 and a pair of parallel resilient straps 26 formed from the two legs of the U-bent shape. Holes or openings 27 are formed along the length of the strip and are evenly spaced apart. A corresponding series of evenly spaced apart holes or openings 28 are formed in the vertical leg 21 of the L-shaped member. The straps and legs are secured together by a mechanical fastener, such as a bolt 30 which passes through washers 31 and is secured by a nut 32.

A C-shaped bracket 33 is secured by a rivet 34 to the horizontal leg 22 of the L-shaped member. The rivet extends through aligned holes 35 and 36 formed in the bracket and leg to provide a vertical axised pivot. Thus, the bracket can be turned in the horizontal direction, about the vertical axis, relative to the hanger. Preferably, the bracket is provided with a pair of opposed flanges 37 to partially close its forward opening 38.

The tailpipe or muffler clamp 11, which is a conventional device, is formed of a U-shaped shackle 39 having threaded ends 40 which extend through openings 41 in a base 42. The threaded shackle ends are secured in place by means of base nuts 43. The base is provided with an arcuate edge 44 to support the tailpipe 12. An example of such a type muffler clamp is illustrated in the above identified U.S. Pat. No. 4,004,768 to Evans.

In operation, the tailpipe hanger of this invention is used to replace a tailpipe hanger which is broken or alternatively, which has been removed in order to replace the vehicle tailpipe or muffler. Where tailpipes and mufflers are replaced, it is conventional to also replace the hangers because these tend to be so corroded or otherwise worn as to make it difficult to reuse.

Thus, as illustrated in FIG. 1, the hanger of this invention is shown as simply looped over the pre-existing vehicle frame bracket 40. The muffler clamp or tailpipe clamp 11 is arranged around the new tailpipe 12 and the shackle is slipped into the C-shaped bracket 33 through the opening 38 between the flanges 36. Then, the nuts 43 are tightened to secure the muffler clamp to the tailpipe and to the C-shaped bracket. This is a typical installation.

FIG. 4 illustrates a different installation where a machine screw or bolt 47 is used to secure the bight 25 of the resilient strip directly to the vehicle frame or chassis 13. The screw or bolt may be extended through a washer 48 to clamp the bight portion of the strip against the vehicle adjacent portion.

FIG. 5 illustrates another mounting arrangement where the overlapping portions of the strap ends of the resilient strips are uneven, i.e., the overlap is varied in order to extend the vertical length of the loop or bight portion of the strip. Here, the fastening bolt 30 is passed through the upper-most opening in the L-shaped member vertical leg. Alternatively, an additional bolt may be used to also fasten the longer of the two strap portions to the bottom-most opening in the vertical leg 21. As can be seen from FIG. 5, the overlapping portions of the strip can be varied in length and the different holes can be utilized to thereby vary the vertical height of the hanger.

FIG. 6 illustrates the hanger supported from a rod-like support 50, whose cross section may vary. Here, the strip is fastened at one end to the leg of the L-shaped member and the opposite end of the strip is threaded around the support and is turned back upon itself and fastened by means of another bolt 30a around the support 50.

FIG. 7 illustrates yet another way of mounting the hanger where the supports on the vehicle are spaced apart or difficult to use as a one piece support. Thus, the strip is split in half along the bight to form a pair of separated straps 26a, each of which is fastened by a machine screw or bolt 54 extending through washers 55 into the separate support portions 56 of the vehicle.

As can be seen, the hanger of this invention may be mounted upon the vehicle in numerous ways to accommodate to different model vehicles and different arrangements and spacings of tailpipes beneath such vehicles. Hence, a service shop or garage can use the hanger herein for virtually every type of situation encountered in replacing the original tailpipe hangers.

Having fully described an operative embodiment of this invention, I now claim:

1. An adjustable tailpipe hanger for securing a tailpipe upon a support means formed on a vehicle, comprising:

a narrow-thin, sheet-like, rigid strip formed as an L-shaped member having a vertical leg and a horizontal leg;

an elongated, narrow rubber-like strip normally double bent into an inverted U-shape to form a loop-like bight and a pair of depending, resilient straps;

said vertical leg being normally arranged between, secured to, and having its opposite faces overlapped by the free end portions of said resilient straps, with said bight being located at a distance considerably above the L-shaped member for looping over the vehicle support means and thereby, supporting the hanger therefrom;

a series of uniformly spaced apart openings formed along the lengths of the resilient straps and the L-shaped member vertical leg, whereby openings on the vertical leg and the overlapping portions of the resilient straps may be selectively aligned;

releasable, bolt-like mechanical fastening means normally extending through aligned openings in the vertical leg and straps for securing the straps to the vertical leg at pre-selected locations for varying the amount of relative vertical overlap of the straps relative to the vertical leg, and thereby, varying the over-all length of the hanger, and said vertical leg being considerably longer than the horizontal leg and normally being overlapped by a considerable length of at least one of the resilient strap free end portions and secured to that free end portion by said mechanical fastening means for stiffening the hanger along the vertical axis thereof;

and a C-shaped bracket having opposed flanges forming an opening, said bracket secured to the horizontal leg of the L-shaped member and arranged for connection to a tailpipe for suspending the tailpipe from the hanger, and said bracket being secured to said horizontal leg by means of a vertically axised pivot pin that passes through said horizontal leg and one of said opposed flanges so that the bracket may pivot in a horizontal direction relative to the vertical axis of the hanger for pre-determined adjustment for connection to the tailpipe.

2. A tailpipe hanger as defined in claim 1, and wherein the amount of overlap of each of the resilient strap free end portions relative to the vertical leg is varied relative to the other strap free end portion, to thereby vary the length of the hanger.

3. A tailpipe hanger as defined in claim 1, and said bight being severable for separating the two resilient straps for separate fastening to the vehicle support means.

* * * * *